United States Patent

Rink

(10) Patent No.: US 8,888,644 B2
(45) Date of Patent: Nov. 18, 2014

(54) PLANETARY ROLLER GEAR DRIVE

(71) Applicant: Schaeffler Technologies AG & Co. KG, Herzogenaurach (DE)

(72) Inventor: Thomas Rink, Waldfenster (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 35 days.

(21) Appl. No.: 13/707,811

(22) Filed: Dec. 7, 2012

(65) Prior Publication Data

US 2013/0157801 A1  Jun. 20, 2013

(30) Foreign Application Priority Data

Dec. 19, 2011  (DE) .......................... 10 2011 088 995

(51) Int. Cl.
| | |
|---|---|
| *F16H 13/14* | (2006.01) |
| *F16H 29/20* | (2006.01) |
| *F16H 29/02* | (2006.01) |
| *F16H 27/02* | (2006.01) |
| *F16H 3/06* | (2006.01) |
| *F16H 1/24* | (2006.01) |
| *F16H 55/02* | (2006.01) |
| *F16H 1/28* | (2006.01) |
| *F16H 25/22* | (2006.01) |
| *F16H 25/20* | (2006.01) |

(52) U.S. Cl.
CPC .............. *F16H 1/28* (2013.01); *F16H 25/2252* (2013.01); *F16H 25/2015* (2013.01)
USPC .......................... 475/195; 74/89.23; 74/424.81

(58) Field of Classification Search
USPC ................ 475/195; 74/424.81, 424.82, 89.23
See application file for complete search history.

(56) References Cited

U.S. PATENT DOCUMENTS

| | | | |
|---|---|---|---|
| 5,086,861 A * | 2/1992 | Peterson ........................ | 180/445 |
| 6,105,737 A * | 8/2000 | Weigert et al. ................ | 188/158 |
| 2006/0214453 A1* | 9/2006 | Gerhardt ........................ | 296/57.1 |
| 2012/0217117 A1* | 8/2012 | Gramann et al. .............. | 192/83 |

FOREIGN PATENT DOCUMENTS

| | | |
|---|---|---|
| DE | 102009040606 | 3/2011 |
| JP | 2007162721 | 6/2007 |
| WO | WO 2011050766 A1 * | 5/2011 |

* cited by examiner

*Primary Examiner* — Tisha Lewis
(74) *Attorney, Agent, or Firm* — Volpe and Koenig, P.C.

(57) ABSTRACT

Planetary roller gear drive with a spindle nut (1) that is arranged on a threaded spindle (2) and with a plurality of planets (3) that are arranged distributed around the periphery and are in rolling engagement with the threaded spindle (2) and the spindle nut (1). The threaded spindle (2) has a plurality of helical windings wound around the spindle axis forming at least one thread groove (8), and a sensor element (15) is arranged so that it cannot move in the axial direction relative to the spindle nut (1) and detects an axial displacement of the threaded spindle (2) and the spindle nut (1) relative to each other. The spindle nut (1) is supported so that it can rotate about the spindle axis on a housing (12) with the sensor element (15).

3 Claims, 2 Drawing Sheets

PLANETARY ROLLER GEAR DRIVE

INCORPORATION BY REFERENCE

The following documents are incorporated herein by reference as if fully set forth: German Patent Application No. 102011088995.7, filed Dec. 19, 2011.

BACKGROUND

The present invention relates to a planetary roller gear drive that converts a relative rotation between the spindle nut and threaded spindle into a translational relative displacement between the spindle nut and threaded spindle.

From DE 102009040606 A1, a planetary roller gear drive is known that is provided with a plurality of planets that are arranged distributed about the periphery and are in rolling engagement with the threaded spindle and the spindle nut, wherein the threaded spindle has a plurality of helical windings wound about the spindle axis in at least one threaded groove. The spindle nut is provided on its inner periphery with a nut-side profile, wherein the planet-side profile of the planets is in rolling engagement with the nut-side profile. The planets are provided with annular, closed grooves that are arranged perpendicular to the planetary axis. The planets revolve on orbits that are arranged perpendicular to the spindle axis.

Slippage between the threaded spindle and spindle nut can be observed when such planetary roller gear drives are operating.

According to DE 102009040606 A1, a longitudinal measurement system is provided for determining the position. This system has a sensor that is connected rigidly to the spindle nut and scans the threaded spindle. The sensor detects the advancing windings of the threaded groove, wherein the threaded spindle is used as a dimensional body for determining an axial position of the spindle nut and threaded spindle relative to each other.

For an improved position determination, DE 102009040606 A1 also provides a rotary encoder that is formed as an absolute value encoder and indicates an absolute angular position of the threaded spindle.

SUMMARY

The object of the invention is to provide an alternative planetary roller gear drive that allows a position determination.

This objective is met with a planetary roller gear drive having one or more features of the invention. The spindle nut is supported so that it can rotate about the spindle axis on a housing with the sensor element, and the position can also be determined when the spindle nut is rotating. The housing-fixed sensor element can scan the profiling of the threaded spindle formed by the helical threaded groove and can detect advancing windings of the threaded groove and forward corresponding signals, for example, to a counter.

According to DE 102009040606 A1, the spindle nut is fixed in rotation and the threaded spindle is set in rotation by a motor. The spindle nut cannot be rotated, because the sensor element attached to the spindle nut rules out rotation of the spindle nut. The arrangement according to the invention allows a simple attachment of suitable sensor elements on the housing, so that the position can also be determined when the spindle nut is being driven.

The threaded spindle can be provided in a known way with a plurality of helical windings wound about the spindle axis on at least one threaded groove, wherein the threaded groove is bounded by a groove base and by thread flanks that open into thread peaks. Adjacent windings are arranged at the distance of the pitch t.

For a single-start threaded spindle, the pitch t is equal to the lead p of the threaded groove. For a multi-start threaded spindle with multiple thread starts G, the pitch t=p/G, that is, it is formed by the quotient of the lead p divided by the number of starts G. Planetary roller gear drives according to the invention can have a single-start or multi-start construction.

Particularly, magnetoresistive sensors are suitable for the invention. For magnetoresistive sensors, the electrical resistance is dependent on the magnetic field that these sensors detect. The detected magnetic field shows a sinusoidal profile with upper and lower extreme values that are reached when the sensor is lying exactly above a thread tip or a groove base of the threaded groove. For magnetoresistive sensors, the electrical resistance of the scanning sensor changes while passing over a winding of the threaded groove that is bounded by a groove base and by thread flanks that open into thread tips. The sensor responds with sinusoidal changes of its electrical resistance due to a change in the magnetic flux that is dependent on the position of the groove base and the thread tips with respect to the sensor. By means of suitable measurement technology, this change in the electrical resistance can be evaluated for improved determination of the position.

This property of the magnetoresistive sensors can be used advantageously with so-called magnetically biased sensors. In these magnetically biased sensors, the sensor is provided with a support magnet that can be constructed as a permanent magnet. When the threaded spindle that can be magnetized passes the magnetically biased sensor—that is, threaded tips and groove bases pass the sensor—the magnetic field changes due to the groove structure of the threaded spindle for each change from winding to winding. The change of the magnetic field is detected by the biased sensor as a change in the electrical resistance. Based on this change, the sensor element according to the invention can output a signal that allows a precise determination of position.

The housing can have a recess that is penetrated by the threaded spindle and in which the sensor element is arranged. The sensor element can be constructed as a ring and can be equipped with a plurality of sensors that are interlinked in a known way by a bridge circuit. The ring can be arranged coaxial to the threaded spindle and can be inserted in a housing borehole or in a recess of the housing.

The sensor element can also be constructed as a header element that can be attached to the housing, for example, by means of a flange connection.

BRIEF DESCRIPTION OF THE DRAWINGS

The invention will be explained in more detail with reference to an embodiment shown in five figures. In the drawings.

DETAILED DESCRIPTION OF THE PREFERRED EMBODIMENTS

Figure 1:
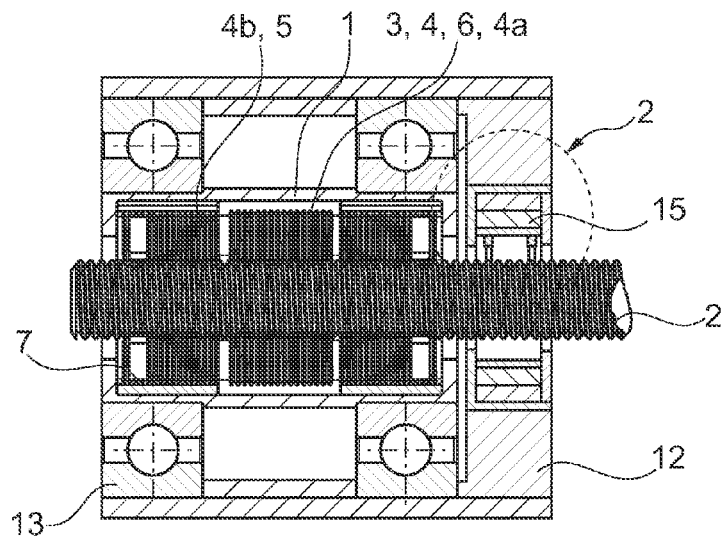
FIG. 1 is a longitudinal section through a planetary roller gear drive.

FIG. 1 shows a planetary roller gear drive according to the invention in a longitudinal section. A spindle nut 1 is arranged so that it can rotate on a rotationally fixed threaded spindle 2. The spindle nut 1 can be driven by a motive drive, not shown, and can be set in rotation.

Figure 2:
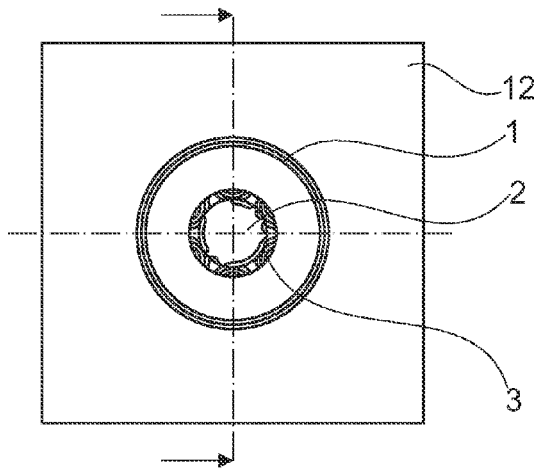
FIG. 2 is a view of the planetary roller gear drive according to the invention from FIG. 1.

A plurality of planets 3 that are arranged distributed over the periphery of the threaded spindle 2 are in rolling engagement with the threaded spindle 2 and the spindle nut 1. The distribution of the planets can be seen in FIG. 2. The planets 3 revolve on circular paths about the spindle axis of the threaded spindle 2. They rotate about their planet axis and rotate relative to the threaded spindle 2 and the spindle nut 1, wherein the planets 3 roll on the inner periphery of the spindle nut 1 and on the outer periphery of the threaded spindle 2.

In a known way, the planets 3 are provided with a planet-side profile 4 that meshes with the threaded spindle 2 and the spindle nut 1. The planets 3 are provided on both ends with pins 5 that are set off in the radial direction and are connected to each other integrally by a middle piece 6 that extends in the radial direction. The planet-side profile 4 has a middle profile section 4a that is formed on the outer periphery of the middle piece 6. The profile section 4a meshes with the threaded spindle 2. The two pins 5 are provided on their outer periphery with an outer profile section 4b that meshes with the spindle nut 1. The profile sections 4a, 4b are formed by annular, closed grooves that are arranged parallel to each other.

The spindle nut 1 is provided on its inner periphery on both axial ends with a nut-side profile 7 that meshes with the planet-side outer profile sections 4b. The nut-side profile 7 is formed by annular, closed grooves that are arranged parallel to each other.

Figure 3:
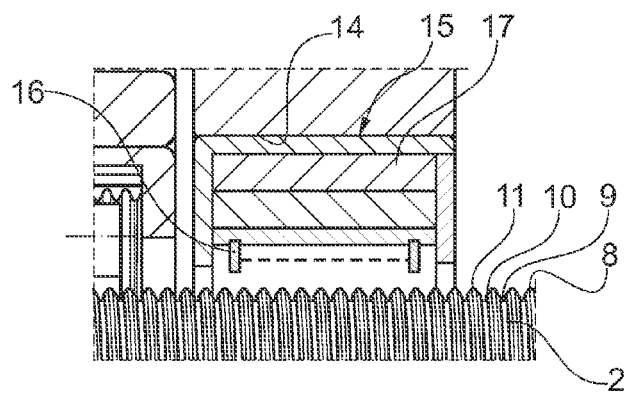
FIG. 3 is an enlarged detail view from FIG. 1.

The threaded spindle 2 is provided on its outer periphery with a thread groove 8 that is formed from a plurality of helical windings 9 wound about the spindle axis. FIG. 3 clearly shows that the threaded groove 8 is bounded by a groove base 9 and thread flanks 10 that open into thread tips 11. The threaded groove 8 meshes with the middle profile section 4a of the planets 3.

The spindle nut 1 is supported so that it can rotate on a housing 12 via two roller bearings 13. The housing 12 is penetrated by the threaded spindle 2 and is provided on its axial end with a recess 14 that is arranged coaxial to the spindle axis. In this recess 14 there is a sensor element 15 of a measuring device that is not shown in more detail and is provided for determining the axial position of the threaded spindle 2 with respect to the spindle nut 1. The sensor element 15 has an annular shape in the present case, but it could also have a different shape. The sensor element 15 is held in the recess 14 of the housing 12. The sensor element 15 and the spindle nut 2 are positioned in the axial direction relative to each other.

In the preferred embodiment, the sensor element 15 has ten sensors 16 that are arranged with an axial distance relative to each other along the spindle axis. In FIG. 3, only the first sensor 16 and the tenth sensor 16 are shown. The sensors 16 are so-called magnetoresistive sensors whose electrical resistance is dependent on a detected magnetic field. The sensors 16 are biased magnetically by a support magnet 17 constructed as a permanent magnet. When one of the sensors 16 is arranged exactly over a thread tip 11, this sensor detects a maximum magnetic flux. If the sensor 16 is located exactly over a groove base 9, the sensor 16 detects a minimum magnetic flux. The change between these extreme values has a sinusoidal shape.

For planetary roller gear drives, the axial advance between the threaded spindle and spindle nut for a full revolution between the spindle nut and threaded spindle does not match the lead of the thread of the threaded spindle. For this reason, for an observer who is stationary with respect to the spindle nut 2, the individual windings of the threaded groove 8 move past and can be detected. A different behavior is given for a screw-nut connection in which, under a full revolution of the screw relative to the nut, there is an axial advance that corresponds to the lead of the screw thread. For this reason, the windings of the screw stay still for an observer who is stationary with respect to the spindle nut 2.

In the embodiment according to the invention, the threaded spindle is arranged so that it is locked in rotation and can move in the axial direction relative to the housing 12. The sensor element 15 is fixed relative to the housing. For an observer who is stationary with respect to the housing 12, the individual windings of the threaded groove 8 move past and can be detected.

The sensor element 15 detects changes of the magnetic field during a relative rotation between the threaded spindle 2 and spindle nut 1 and allows a precise axial determination of the position of the threaded spindle 2 with respect to the spindle nut 1.

Figure 4:
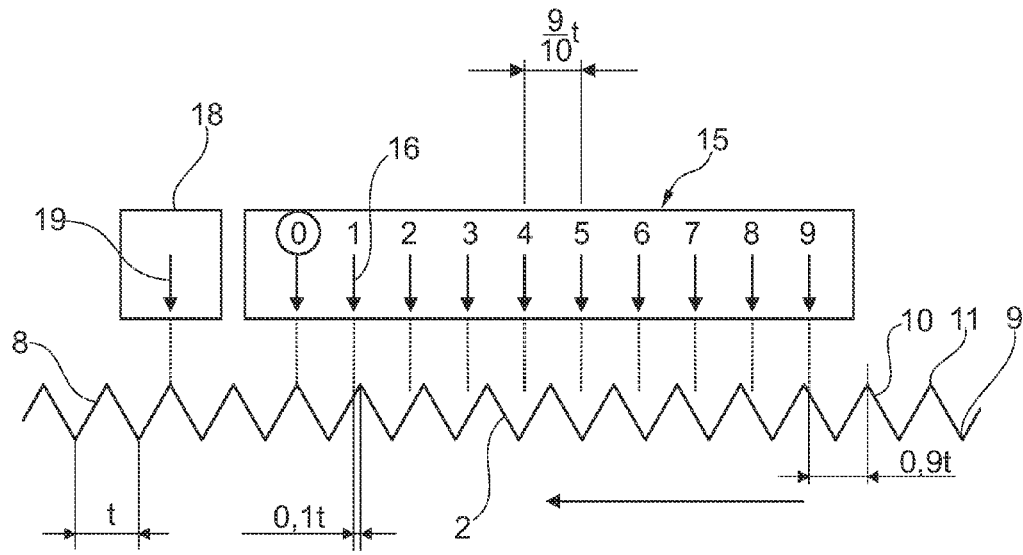
FIG. 4 is a block diagram of a $\frac{1}{10}$ vernier scale according to the invention of the planetary roller gear drive.
Figure 5:
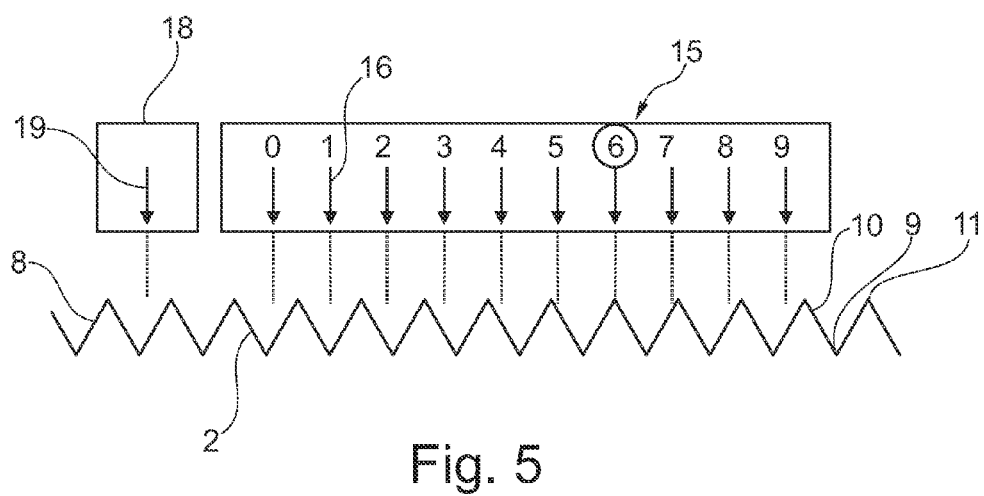
FIG. 5 is another block diagram with vernier scale shifted relative to FIG. 4.

FIGS. 4 and 5 show the sensor element 15 and the threaded spindle in a schematic diagram. In addition to the embodiment according to FIG. 1, in FIGS. 4 and 5 a counter 18 is also provided with a sensor 19 that can be integrated in the sensor element 15 in the embodiment according to FIG. 1.

FIG. 4 shows the ten sensors 16 that are arranged along the threaded spindle 2 in the sensor element 15. The axial distance between two adjacent sensors 16 is $(9/10)t$, where "t" is the pitch of the threaded groove 8. Each of these sensors 16 represents a whole number from 0 to 9, wherein the digits are allocated to the sensors 16 along the spindle axis in ascending order.

In this arrangement, the sensor element 15 forms a vernier scale that will be explained in more detail below.

The sensor 19 of the counter 18 detects a change in the magnetic field under a relative displacement between the threaded spindle and spindle nut. The counter is incremented by a value each time a winding of the threaded groove 8 passes and thus counts the number of windings that pass the sensor.

From the diagram it can be seen that the counter sensor 19 of the counter 18 is exactly over one of the thread tips 11 of the threaded groove 8. In this position between the threaded spindle 2 and spindle nut 1, the first sensor 16—sensor zero— of the sensor element 15 is also arranged exactly over a thread tip 11. The second sensor 16—sensor one—lies $(1/10)t$ in front of the next thread tip 11. The third sensor 16—sensor two— lies $(2/10)t$ in front of the following thread tip 11. Finally, the tenth sensor 16—sensor nine—lies $(9/10)t$ in front of the subsequent thread tip 11. In the diagram, the sensor zero is marked with a circle, in order to identify it as the sensor 16 that lies exactly above a thread tip 11.

If the threaded spindle 2 is shifted by 4.6 windings relative to the sensor element 15 in the axial direction toward the left in the direction of the arrow, this produces a position in which the sensor 19 of the counter 18 has counted four thread tips 11 and remains between two adjacent thread tips 11. In order to be able to determine the exact position between these thread tips 11, the sensor element 15 supplies a corresponding signal. In the example, due to the vernier scale function, the sensor six 16 is above a thread tip 11. It is positioned at a shift of 0.6t in the decimal range. While the counter 18 counts the windings, as a vernier scale, the sensor element 15 determines the exact position within two adjacent windings. In the decimal range from 0.1t to 0.9 t, one of the thread tips 11 is allocated to each sensor 16. Instead of a thread tip 11, the groove base 9 could also be used as a reference point for determining the position. A conversion into a length dimension is easy if the pitch t is known. This length dimension can be indicated, e.g., in mm.

For a backwards movement of the threaded spindle 2, the decimal position can be determined by the difference of the sensor 16 that outputs the signal relative to the value 1t. If, for example, the threaded spindle 2—starting from the position according to FIG. 4—is shifted to the right by 0.3t, the sensor seven 16 is positioned above a thread tip. The decimal position is given by the difference 1t−0.7t=0.3t.

The counter 18 can also be integrated in the sensor element 15. For example, one of the sensors 16—for example, the sensor zero—could also be used as a counter sensor.

For the initialization of the counter 18, a reference run can be performed, wherein a run up to the other end is performed starting from an end position between the threaded spindle and the spindle nut and wherein the counter is set to zero at the beginning of the reference run and indicates, at the end of the reference run, a whole number value that corresponds to the number of the windings that passed the sensor. In this way, an absolute position of the threaded spindle 2 relative to the spindle nut 1 can be determined.

The invention is equally suitable for planetary roller gear drives in which the threaded spindle is driven to rotate and the spindle nut is held locked in rotation. In this case, the sensor element according to the invention can be held locked in rotation relative to the spindle nut. As the sensor elements, all sensor types are suitable that can detect when windings of the threaded spindle pass the sensor. Magnetoresistive sensors can detect magnetic fields, wherein a magnetic flux is dependent on the position of the thread tips and the groove bases with respect to the sensor.

LIST OF REFERENCE NUMBERS

1. Spindle nut
2. Threaded spindle
3. Planet
4. Planet-side profile
4a Middle profile section
4b Outer profile section
5. Pin
6. Middle piece
7. Nut-side profile
8. Thread groove
9. Groove base
10. Thread flank
11. Thread tip
12. Housing
13. Roller bearing
14. Recess
15. Sensor element
16. Sensor
17. Support magnet
18. Counter
19. Counter sensor

The invention claimed is:

1. A planetary roller gear drive, comprising a spindle nut that is arranged on a threaded spindle and with a plurality of planets that are arranged distributed around a periphery and in rolling engagement with the threaded spindle and the spindle nut, the threaded spindle has a plurality of helical windings wound around a spindle axis forming at least one thread groove, and a sensor element having at least one magnetoresistive sensor having an electrical resistance that changes under the influence of a magnetic field is arranged so that it cannot move in an axial direction relative to the spindle nut and detects an axial displacement of the threaded spindle and the spindle nut relative to each other, the spindle nut is supported for rotation about the spindle axis on a housing with the sensor element.

2. The planetary roller gear drive according to claim 1, wherein the housing has a recess that is penetrated by the threaded spindle, and the sensor element is arranged in the recess.

3. The planetary roller gear drive according to claim 2, wherein the sensor element is annular and is arranged coaxial to the threaded spindle in the recess.

* * * * *